United States Patent [19]

Sato et al.

[11] Patent Number: 4,629,774
[45] Date of Patent: Dec. 16, 1986

[54] POST-TREATMENT OF SYNTHETIC FIBER FABRICS

[75] Inventors: Kazuo Sato; Masahiro Komori, both of Kyoto; Sumio Goto, Moriyama, all of Japan

[73] Assignee: Dai-Ichi Kogyo Seiyaku Co., Ltd., Kyoto, Japan

[21] Appl. No.: 771,758

[22] Filed: Sep. 3, 1985

[30] Foreign Application Priority Data

Sep. 10, 1984 [JP] Japan .................................. 59-189319

[51] Int. Cl.[4] ...................... C08G 18/02; C08G 18/48; D06M 13/42
[52] U.S. Cl. ..................................... 527/301; 527/302; 525/54.22; 8/115.54; 8/115.66; 8/115.67
[58] Field of Search ........................ 527/300, 301, 302; 525/54.22; 8/115.54, 115.56, 115.66, 115.67

[56] References Cited

U.S. PATENT DOCUMENTS 3,311,608  3/1967  Murphy ............................... 527/301
3,386,931  6/1968  Smart et al. ....................... 525/54.22
3,475,356  10/1969  Davis et al. ...................... 525/54.22

Primary Examiner—Morton Foelak
Assistant Examiner—Nathan M. Nutter
Attorney, Agent, or Firm—Millen & White

[57] ABSTRACT

Synthetic fiber-containing fabrics are post-treated by impregnating the fabrics with an aqueous solution or dispersion of a thermally reactive blocked isocyanate group-containing polysaccharide derivative and then baking the impregnated fabrics. The blocked isocyanate group-containing polysaccharide derivative is produced by reacting a hydroxy-alkylated natural polysaccharide with a polyisocyanate compound to form a urethane polymer having at least one free isocyanate group, and then blocking the free isocyanate group with a blocking agent. The hydroxyalkylate natural polysaccharide may be directly reacted with a polyisocyanate compound having at least one blocked isocyanate group.

10 Claims, No Drawings

POST-TREATMENT OF SYNTHETIC FIBER FABRICS

BACKGROUND OF THE INVENTION

This invention relates to a method for treating synthetic fiber fabrics. More particularly, it relates to a method for imparting synthetic fiber fabrics with durable water- and moisture-absorption properties by post-treating the fabrics without compromising color fastness.

Attempts have been made to impart water-absorption properties to synthetic fiber containing-fabrics by post-treating the fabric with a treating agent having polyoxyethylene chains. Such treatments are not successful, though the water-absorption properties may be improved, in that the moisture absorption or pickups of the resulting fabrics when exposed to humid environment is not sufficiently high and that the increased water-absorption is not compatible with the color fastness, particularly frictional color fastness of the resulting fabrics. Thus the known treatment finds only limited uses where fabrics are undyed or dyed with those dyestuffs having high fastness.

It is therefore a principal object of the present invention to provide a method of treating synthetic fabrics for imparting them with increased water- and moisture-absorption properties and color fastness.

Other objects and advantages of the present invention will become apparent as the description proceeds.

SUMMARY OF THE INVENTION

According to the present invention, there is provided a method for treating synthetic fiber containing-fabrics comprising the steps of impregnating the fabrics with an aqueous solution or dispersion of a thermally reactive blocked isocyanate group-containing polysaccharide derivatives and then heating the impregnated fabrics at an elevated temperature at which the polysaccharide derivative may regenerate free isocyanate function. The blocked isocyanate group-containing polysaccharide derivative may be synthesized by reacting a $C_1$-$C_4$ hydroxyalkylated natural polysaccharide with a polyisocyanate compound to form a urethane polymer having at least one free isocyanate group, and then blocking the free isocyanate group with a blocking agent. Alternatively, the $C_1$-$C_4$ hydroxyalkylated natural polysaccharide may be reacted with a polycyanate compound having both free and blocked isocyanate groups.

DETAILED DISCUSSION

Non-limiting examples of polysaccharides include starch, dextran, guar gum, tamarind gum and cellulose.

Hydroxyalkylated polysaccharides may be prepared by reacting natural polysaccharides with an alkylene oxide such as ethylene oxide, propylene oxide or butylene oxide in well-known manner. Examples of the resulting adducts include hydroxyethylcellulose, hydroxypropylcellulose or hydroxybutylcellulose having different degrees of substitution. Corresponding hydroxyalkylated starch, dextran, guar gum or tamarind gum may also be used. Also included are polysaccharide-polyalkylene glycol ethers in which one or more polyalkylene glycol molecules are attached to the polysaccharide molecule through a etherial linkage. Accordingly, the term "hydroxyalkylated" as used herein includes both cases in which the oxyalkyl moiety is non-recurring and recurring.

Examples of polyisocyanate compounds include various polyisocyanates and urethane prepolymers having at least two free isocyanate groups per molecule. Nonyellowing diisocyanates such as xylylenediisocyanate or other araliphatic diisocyanates, isophorondiisocyanate or other cycloaliphatic diisocyanates, and hexamethylenediisocyanate or other aliphatic diisocyanates are preferable.

Urethane prepolymers having at least two free isocyanate groups per molecule may be prepared, as well-known, by reacting an excess of polyisocyanate with a polymeric polyhydroxyl compound such as polyether polyols or polyester polyols. Polyols having a quarternary cationic group, such as those produced by reacting a quarternizing agent such as dimethyl sulfate with an adduct of alkylene oxide and a tertiary amine such as triethanolamine or N-methyldiethanolamine.

Precursors of thermally reactive blocked isocyanate group-containing polysaccharide derivatives of the present invention are then synthesized by reacting a hydroxyalkylated natural polysaccharide and a polyisocyanate compound of the type as described above at an NCO/OH ratio greater than 1.0, preferably greater than 2.0. The reaction may be carried out in an inert solvent as desired. Hydrophilic inert solvents such as dioxane, methyl ethyl ketone, dimethylformamide, dimethylsulfoxide and the like are preferable.

Since the resulting precursors are liable to gelling upon the reaction with water and other active hydrogen compounds, the free isocyanate function present in the precursor is blocked or masked by a blocking agent. Any known blocking agent may be used. Examples of suitable blocking agents which do not render the blocked products water-soluble or dispersible include secondary or tertiary alcohols such as isopropanol and tert.-butanol; active methylene compounds such as dialkyl malonate, acetylacetone and alkyl acetoacetate; oximes such as methyl ethyl ketoxime and cyclohexanone oxime; lactams such as ε-caprolactam; phenols such as phenol, chlorophenol, cresol, p-tert.-butylphenol and p-nonylphenol; heterocyclic hydroxyl compounds of imidazole, pyridine, quinoline or quinaldine series. Alkali metal bisulfites such as sodium bisulfite or potassium bisulfite may also be used for blocking the free isocyanate function and at the same time for rendering the blocked product water-soluble or water-dispersible.

These blocking agents may be reacted with the free isocyanate group-containing precursors in a stoichiometric amount or slightly excess thereof relative to the free isocyanate content to give thermally reactive blocked isocyanate group-containing polysaccharide derivatives of the present invention. Alternatively, the free isocyanate group-containing precursors may be reacted with less than stoichiometric amounts of blocking agents other than bisulfite and then with the bisulfite blocking agent to fully block the remaining free isocyanate function while rendering the resulting blocked products water-soluble or water-dispersible. As a further alternative embodiment, in place of the bisulfite blocking agent, a compound having at least one active hydrogen atom-donating group such as primary or secondary amino group and at least one ionizable group such as sulfonate or carboxylate group may be used in the just described reaction in order to render the blocked products water-soluble or water-dispersible.

Examples of amino sulfonates or amino carboxylates include lithium, sodium, potassium or ammonium salt of taurine, N-methyltaurine, N-butyltaurine, sulfanilic acid, glycine or alanine.

The blocking reaction may be carried out at a temperature from room temperature to 100° C., preferably from 30° C. to 90° C. optionally in hydrophilic inert solvent such as dioxane, methyl ethyl ketone, dimethylformamide, methanol, ethanol or isopropanol and in the presence of a catalyst such as triethylamine, alkali metal lower alkoxide or dibutyltin dilaurate.

When blocking agents other than bisulfites are used it is possible to block a part of isocyanate groups possessed by the polyisocyanate compound with these blocking agents followed by reacting the resulting partially blocked polyisocyanate compound with the hydroxyalkylated natural polysaccharide.

The resulting polysaccharide derivatives having blocked isocyanate groups are stable in an aqueous solution or dispersion for a long period of time upon storage. The solution or dispersion may be used for treating fabrics made of synthetic fibers such as polyester fiber, polyamide fiber, acrylic fiber or polyolefin fiber, or blends of these synthetic fibers themselves or with natural fibers to give these fabrics durable water- and moisture-absorption properties without compromising their color fastness. To this end, the fabrics are impregnated or coated with an aqueous solution or dispersion of the blocked isocyanate group-containing polysaccharide derivative and then heated at an elevated temperature at which the free isocyanate function may be regenerated. Usually a temperature from 100° C. to 180° C. is preferable. The regenerated free isocyanate function may react with each other and/or fiber polymer molecules and the applied coatings may be fully cured through these crosslinking reactions. The aqueous solution or dispersion may, or course, contain various auxiliary agents such as softening agents, penetrating agents, catalysts and the like.

The following examples will further illustrate the present invention. All parts and percents therein are by weight unless otherwise indicated.

EXAMPLE 1

100 parts of cellulose polypropylene glycol ether produced by reacting cellulose with 6 moles per glucose unit of propylene oxide were reacted with 433 parts of a urethane prepolymer having an isocyanate group content of 11.3% produced from polypropylene glycol having an M.W. of 400 and hexamethylenediisocyanate in 100 parts of dioxane at 85° C. for 90 minutes.

The reaction mixture which contained 4.4% of isocyanate group based on the combined weight of the cellulose ether and the urethane prepolymer was diluted with 50 parts of ethanol and cooled to 35° C. To the mixture were added 194 parts of a 30% aqueous solution of sodium bisulfite and the mixture stirred at 35°–40° C. for 60 minutes. The product was finally diluted with water to a solid content of 25% to give a clear viscous solution.

EXAMPLE 2

100 parts of cellulose ether used in Example 1 were mixted with 786 parts of urethane prepolymer having an isocyanate group content of 6.1% produced from hexamethylenediisocyanate and polypropylene glycol having an M.W. of 1,000 and 100 parts of dioxane. The mixture was reacted at 90° C. for 120 minutes.

The reaction mixture which contained 2.8% of isocyanate group content based on the combined weight of the cellulose ether and the urethane prepolymer was reacted with 37 parts of methyl ethyl ketoxime at 80° C. for 120° C. to give a blocked product containing 0.75% of isocyanate group based on the combined weight of the cellulose ether and the urethane prepolymer.

To the reaction mixture were added 67 parts of a 35% aqueous solution of sodium taurinate and the mixture stirred at 35°–45° C. for 30 minutes. The product was finally diluted with water to a solid content of 150% to give a clear nonviscous solution.

EXAMPLE 3

100 parts of polybutylene glycol having an M.W. of 400 were reacted with 84 parts of hexamethylenediisocyanate to give a urethane prepolymer containing 11.0% of isocyanate group. The prepolymer was reacted with 23 parts of methyl ethyl ketoxime at 85° C. for 60 minutes which resulted in a free isocyanate group content of 4.0%.

The resulting urethane prepolymer having both free and blocked isocyanate groups was reacted with 108 parts of starch polypropylene glycol ether produced by reacting starch with 6 moles per glucose unit of propylene oxide in 100 parts of dioxane at 90° C. until the free isocyanate function disappeared. The product was diluted with water to a solid content of 20% to give a clear viscous solution.

EXAMPLE 4

To 20 parts of hexamethylenediisocyanate in 50 parts of dioxane were added 22.3 parts of phenol and 0.1 parts of triethylamine. The mixture was heated at 70° C. for 30 minutes to give a partially blocked diisocyanate containing 25.3% of free isocyanate group content.

This reaction product was reacted with 51.3 parts of starch polypropylene glycol ether used in Example 3 at a temperature of 80° C. until the free isocyanate function disappeared. The product was finally diluted with water to a solid content of 15% to give a nonviscous turbid dispersion.

EXAMPLES 5 THROUGH 8

The compositions produced in Examples 1–4 each was diluted to a solid content of 2% with water containing an amount of ELASTRON CATALYST-32 (sold by Dai-Ichi Kogyo Seiyaku Co., Ltd.) corresponding to 12% by weight of the solid content.

A dyed polyester jersey fabric was soaked in a bath containing the above solution, expressed to a pickup of 100% using a mangle machine, dried at 100° C. for 3 minutes and heat-treated at 140° C. for one minute in a baking machine.

Water absorptions of each sample before and after laundering were tested and the results are shown in Table I.

The water absorption was evaluated by the method according to JIS 10798.

Laundering was carried out with a washing solution containing 2g/l of a neutral detergent at a bath ratio of 1:30 at 40° C. for 60 minutes using a houshold washer. Thereafter the fabric was rinsed with water at 40° C. for 60 minutes, expressed and dried.

COMPARATIVE EXAMPLE 1

The same fabric used in Examples 5–8 was soaked in a bath consisting of 2% of a commercially available modifier of the formula:

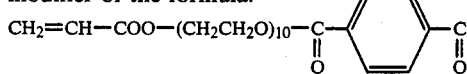

$$CH_2=CH-COO-(CH_2CH_2O)_{10}-\underset{\underset{O}{\|}}{C}-\phantom{XXX}-\underset{\underset{O}{\|}}{C}-(CH_2CH_2O)_{10}-CO-CH=CH_2,$$

0.1% of ammonium persulfate and 97.9% of water. The fabric was expressed to a pickup of 100%, treated at 100° C. at an R.H. of 100%, and baked at 140° C. for one minute.

The water absorptions of the treated fabric before and after laundering were tested as in examples 5–8 and the results are shown in Table I.

TABLE I

| Treating agent | Example No. 5 Ex. 1 | 6 Ex. 2 | 7 Ex. 3 | 8 Ex. 4 | Comparative Ex. 1 Commercial modifier |
|---|---|---|---|---|---|
| Water absorption before laundering (mm) | 80 | 90 | 80 | 75 | 81 |
| Water absorption after laundering (mm) | 75 | 80 | 73 | 70 | 71 |

EXAMPLES 9 THROUGH 12

The compositions produced in Examples 1–4 each was cast into a PTFE coated petri dish having a inner diameter of 10cm in an amount corresponding to 3.0 g of the solid content containing 0.36 g of ELASTRON CATALYST-32.

The cast film was air dried overnight, dried at 60° C. for 3 hours and heated at 140° C. for 10 minutes to obtain a fully cured film.

The moisture absorption of the resulting film was evaluated by exposing the film in an atmosphere having an R.H. of 90% at 25° C. and measuring the percent increase in weight against elapsed time.

The results are shown in Table II.

COMPARATIVE EXAMPLE 2

Examples 9–12 were repeated using a solution of 3.0 g of the commercial modifier used in Comparative Example 1 and 0.15 g of ammonium persulfate in 10 g of water.

The results are shown in Table II.

TABLE II

| Elapsed time, hrs. | % Increase in weight | | | | |
|---|---|---|---|---|---|
| | Ex. 9 | Ex. 10 | Ex. 11 | Ex. 12 | Com. Ex. 2 |
| 12 | 5 | 6 | 6 | 4 | 3 |
| 24 | 25 | 20 | 21 | 18 | 12 |
| 48 | 35 | 40 | 38 | 33 | 18 |
| 72 | 35 | 41 | 39 | 33 | 18 |

EXAMPLES 13 THROUGH 16

The post-treated fabrics obtained in Examples 5–8 were tested on color fastness by the method according to JIS 0849.

The results are shown in Table III.

COMPARATIVE EXAMPLES 3 AND 4

The post-treated fabrics obtained in Comparative Example 1 and the untreated fabric used in Examples 5–8 were tested on color fastness as in Examples 13–16.

The results obtained are shown in Table III.

TABLE III

| | Fabrics | | | | | |
|---|---|---|---|---|---|---|
| | Ex. 5 | Ex. 6 | Ex. 7 | Ex. 8 | Com. Ex. 1 | Untreated fabric |
| Dry frictional color fastness, grade | 5 | 5–4 | 5 | 5–4 | 2–3 | 5 |
| Wet frictional color fastness, grade | 5–4 | 5–4 | 5–4 | 5–4 | 2–3 | 5 |

What is claimed is:

1. A composition for use in post-treating synthetic fiber fabrics comprising an aqueous solution or dispersion of a thermally reactive, blocked isocyanate group-containing polysaccharide produced by (a) reacting a $C_1-C_4$ hydroxyalkylated natural polysaccharide with a polyisocyanate compound to form a urethane polymer having at least one free isocyanate group and then blocking the free isocyanate group with a blocking agent, or (b) by reacting said $C_1-C_4$ hydroxyalkylated natural polysaccharide with a polyisocyanate compound having at least one blocked isocyanate group blocked with said blocking agent.

2. The composition of claim 1, wherein said natural polysaccharide is starch, dextran, guar gum, tamarind gum or cellulose.

3. The composition of claim 2, wherein said hydroxyalkylated polysaccharide is an adduct of $C_1-C_4$ alkylene oxide with the natural polysaccharide.

4. The composition of claim 3, wherein said polyisocyanate compound is an aliphatic, cycloaliphatic or araliphatic diisocyanate.

5. The composition of claim 3, wherein said polyisocyanate compound is a urethane prepolymer having a plurality of terminal free isocyanate groups.

6. The composition of claim 1, wherein said blocking agent is a secondary or tertiary alcohol, an active methylene compound, an oxime, a lactam, a phenol, a heterocyclic hydroxyl compound or an alkali metal bisulfite.

7. The composition of claim 6, wherein said urethane polymer has a plurality of free isocyanate groups, a part of said plurality of free isocyanate groups being blocked with said blocking agent other than the bisulfite blocking agent, the remainder of said free isocyanate groups being blocked with said bisulfite blocking agent.

8. The composition of claim 6, wherein said urethane polymer has a plurality of free isocyanate groups, a part of said plurality of free isocyanate groups being blocked with said blocking agent other than the bisulfite blocking agent, the remainder of said free isocyanate groups being reacted with a compound having at least one active hydrogen-donating group and at least one ionizable group.

9. The composition of claim 8, wherein said compound having at least one active hydrogen-donating group and at least one ionizable group is an alkali metal or ammonium salt of taurin, N-methyltaurine, N-butyltaurine, sulfanilic acid, glycine or alanine.

10. The composition of claim 1, further comprising a hydrophilic inert solvent.

* * * * *